United States Patent [19]

Kurth

[11] 4,163,370
[45] Aug. 7, 1979

[54] CONTROLLING THE DRAWING ROLLERS TO PRODUCE DIAMETER PERTURBATIONS IN AN OPTICAL WAVEGUIDE

[75] Inventor: Thomas C. Kurth, Charleston, S.C.

[73] Assignee: Corning Glass Works, Corning, N.Y.

[21] Appl. No.: 853,755

[22] Filed: Nov. 21, 1977

[51] Int. Cl.² .............................................. C03B 37/00
[52] U.S. Cl. ................................................ 65/2; 65/13; 65/DIG. 7; 264/1; 350/96.30
[58] Field of Search .................. 65/2, 13, DIG. 7, 12; 264/1, 167, 168; 350/96 WG, 96.30, 96.10

[56] References Cited

U.S. PATENT DOCUMENTS

| 2,666,976 | 1/1954 | Olmer et al. ...................... 264/167 X |
| 2,847,703 | 8/1958 | Schrenk et al. ................... 264/167 X |
| 3,819,344 | 6/1974 | Thumm ........................................ 65/2 |
| 3,912,478 | 10/1975 | Presby ........................................ 65/2 |
| 4,028,081 | 6/1977 | Marcatili .................................... 65/2 |
| 4,038,062 | 7/1977 | Presby ........................................ 65/2 |

FOREIGN PATENT DOCUMENTS 1529970  11/1968  France ............................................ 65/2

*Primary Examiner*—Robert L. Lindsay, Jr.
*Attorney, Agent, or Firm*—Walter S. Zebrowski; Richard E. Kurtz; Clarence R. Patty, Jr.

[57] ABSTRACT

An optical waveguide having variations in diameter is produced by controlling the drawing rollers. Predetermined diameter variations along the length of an optical waveguide reduce dispersion in multimode waveguides. These diameter variations are produced by varying the rotational speed of the pulling rollers, by varying the diameter of the pulling rollers, by moving the pulling rollers axially or by moving a tensioning roller during the drawing process.

4 Claims, 5 Drawing Figures

CONTROLLING THE DRAWING ROLLERS TO PRODUCE DIAMETER PERTURBATIONS IN AN OPTICAL WAVEGUIDE

BACKGROUND OF THE INVENTION

This invention relates to a method of making optical waveguides and more particularly to a method of making multimode optical waveguides with diameter variations.

Waveguides used in optical communications systems are herein referred to as "optical waveguides" and are normally constructed from a transparent dielectric material such as glass or plastic.

An optical pulse launched into a multimode optical waveguide excites many modes, each traveling at a different group velocity. Such waveguides suffer from multimode dispersion. At the far end of the waveguide, the pulse is spread out in time by an amount that is proportional to the length of the waveguide because of the different group velocities of the modes. Such multimode dispersion can severely limit the information-carrying capacity of the waveguide.

It is known that multimode dispersion in optical waveguides can be reduced by deliberately enhancing coupling among the various modes in the waveguide. In accordance with the teachings of U.S. Pat. Nos. 3,666,348 Marcatili, 3,687,514 Miller and 3,912,478 Presby, mode coupling can be produced by causing variations in such waveguide parameters as core radius, core refractive index and waveguide axis. Since the optical power carried in the waveguide transfers back and forth between slow and fast modes, averaging takes place, so that the propagating light pulse travels at an average group delay, with a resultant reduction in pulse broadening. In the presence of such mode coupling the pulse width increases only as the square root of the waveguide length.

Several methods of fabrication have been suggested for making waveguides with these variations. In the aforementioned Miller et al and Marcatili patents, diameter variations are introduced by changing the velocity of drawing. The drawing velocity is changed by axially moving a member which supports the blank from which the waveguide is drawn.

In the aforementioned Presby patent, the drawing rate is changed to cause changes in the diameter by means of a variable air jet directed against the fiber.

U.S. Pat. No. 3,969,016 discloses the use of a corrugated roller to introduce corrugations into a waveguide to promote mode coupling.

In U.S. Pat. No. 3,909,110, Marcuse, variations in the index of refraction of the core are introduced by varying the doping during fabrication.

It is desirable to introduce diameter variations by changing an easily controlled parameter during the fabrication process.

RELATED APPLICATIONS

Co-pending applications Ser. No. 824,154, filed Aug. 12, 1977, Olshansky and Ser. No. 824,153, filed Aug. 12, 1977, Olshansky disclose the dimensions of perturbations which will produce mode coupling.

SUMMARY OF THE INVENTION

In accordance with this invention, diameter variations are produced during the fabrication of a multimode waveguide by controlling the drawing rollers.

In carrying out the invention in one embodiment thereof, the tangential velocities of a single set of pulling rollers are changed with time in order to produce varying diameter perturbations. The rotational speed of the pulling rollers is changed or the rotational speed is constant and varying diameter pulling rollers are used.

It is an object of the present invention to vary the diameter of a waveguide in a predetermined manner while the waveguide is being drawn by varying an easily controlled parameter of the drawing process.

The foregoing and other objects, features and advantages of the invention will be better understood from the following more detailed description and appended claims.

DESCRIPTION OF PARTICULAR EMBODIMENTS

Figure 1:
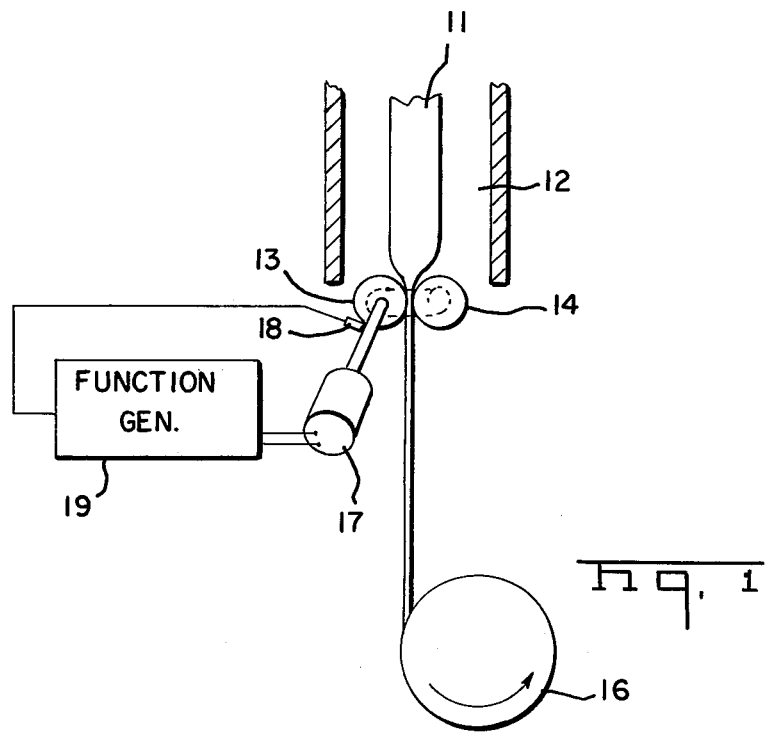
FIG. 1 shows an embodiment of the invention in which the rotational speed of the pulling rollers is changed.

Referring to FIG. 1, a glass waveguide blank 11 formed in a conventional manner is disposed in furnace 12 and maintained at an appropriate temperature for softening the glass so that it may be drawn. Pulling rolls 13, 14 are linked together and draw the glass from the blank into an elongate strand which is wound upon a drum 16.

A servo motor 17 is coupled to pulling rolls 13, 14 and a transducer 18 is provided to feed back a signal representing roll speed, and thus drawing speed. The fedback signal is applied to a function generator 19 which controls the operation of servo motor 17.

In operation, it is initially assumed that pulling rolls 13, 14 are operated at constant speed by motor 17. After transducer 18 counts a predetermined number of revolutions, signifying the passage of a length of waveguide generally corresponding to the interval of a modal interference pattern, function generator 19 varies the speed of motor 17 in accordance with a predetermined function. By speeding up motor 17 the waveguide is drawn more rapidly, producing a reduced diameter; slowing the motor effects an enlargement in waveguide diameter.

Variable speed drives for motor 17 are commercially available. One example of a variable speed drive for the pulling rollers is that supplied by Inland Motor Division of the Kollmorgen Corporation, Radford, Va.

Figure 2:
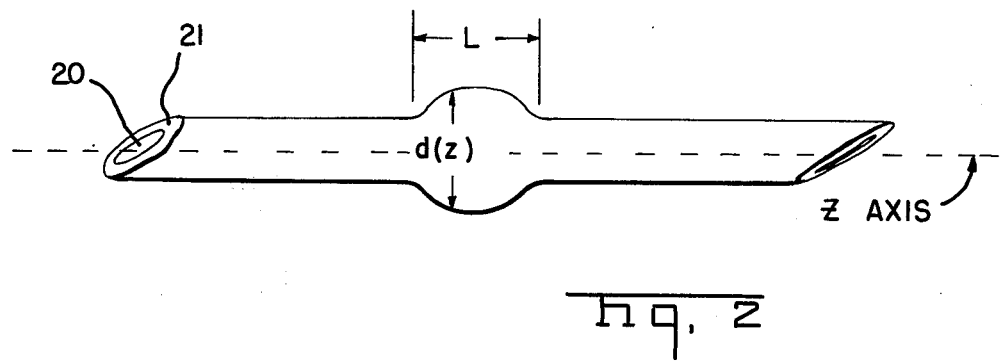
FIG. 2 shows a waveguide with diameter perturbations.

In this manner, a waveguide having perturbations such as those shown in FIG. 2 may be produced.

The waveguide has a core 20 and a cladding 21 with a lower index of refraction than that of the core. Examples of dimensions for L and of drawing speeds for producing these dimensions are given in the aforementioned Olshansky applications which are incorporated herein by reference.

Figure 3:
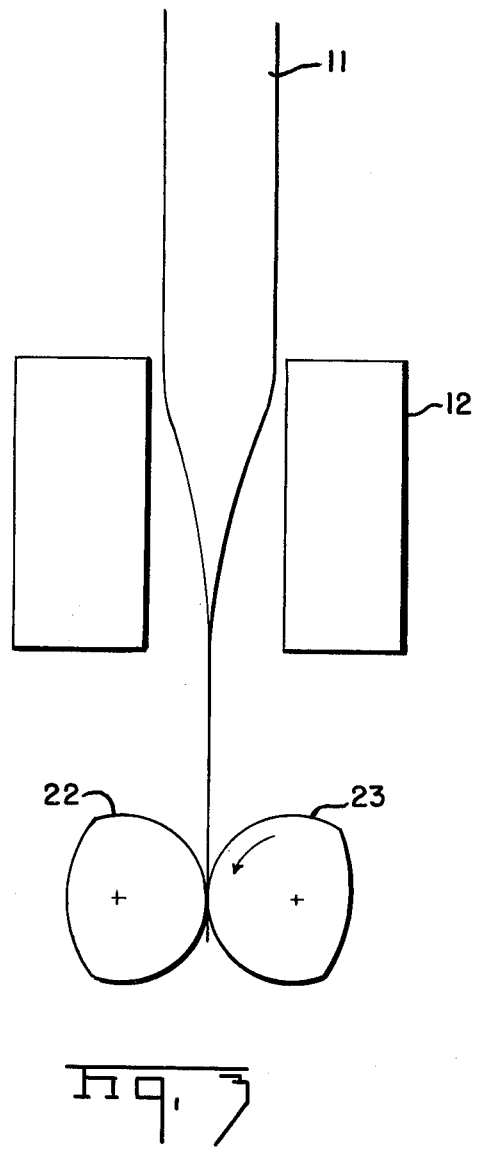
FIG. 3 shows an embodiment of the invention in which the diameter of the pulling rollers varies.

Referring to FIG. 3, variations in the tangential velocity of pulling rollers 22 and 23 are introduced by variations in the radii of the pulling rollers. In this embodiment, pulling rollers 22 and 23 are driven at a constant rotational speed but tangential velocity changes. Tangential velocity is equal to the radius times the angular velocity. The pulling rollers 22 and 23 are biased toward the axis of the blank being drawn so they are in constant contact with the waveguide drawn from blank 11.

Figure 4:
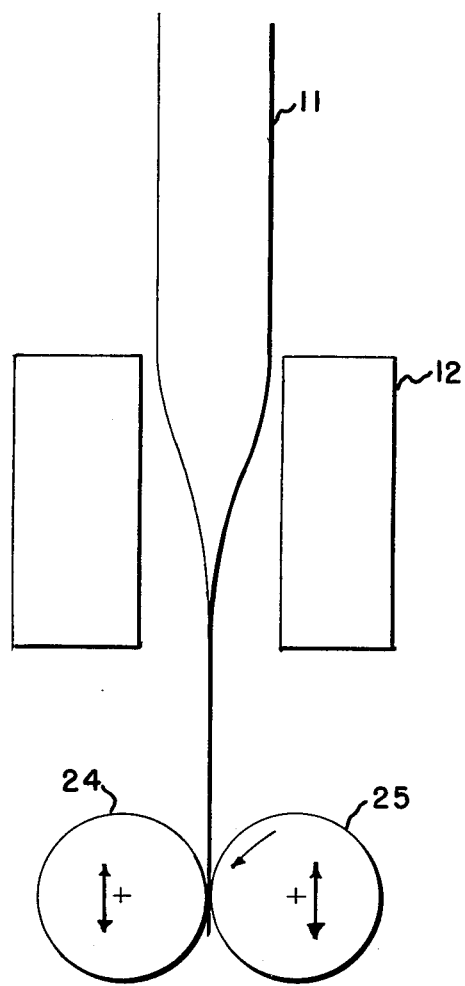
FIG. 4 shows an embodiment of the invention in which the axial position of the pulling rollers is changed.

Referring to FIG. 4, the pulling rolls 24, 25 are moved back and forth along the axis of the blank 11 in order to change instantaneous pulling speed. This introduces diameter variations in the waveguide.

Figure 5:
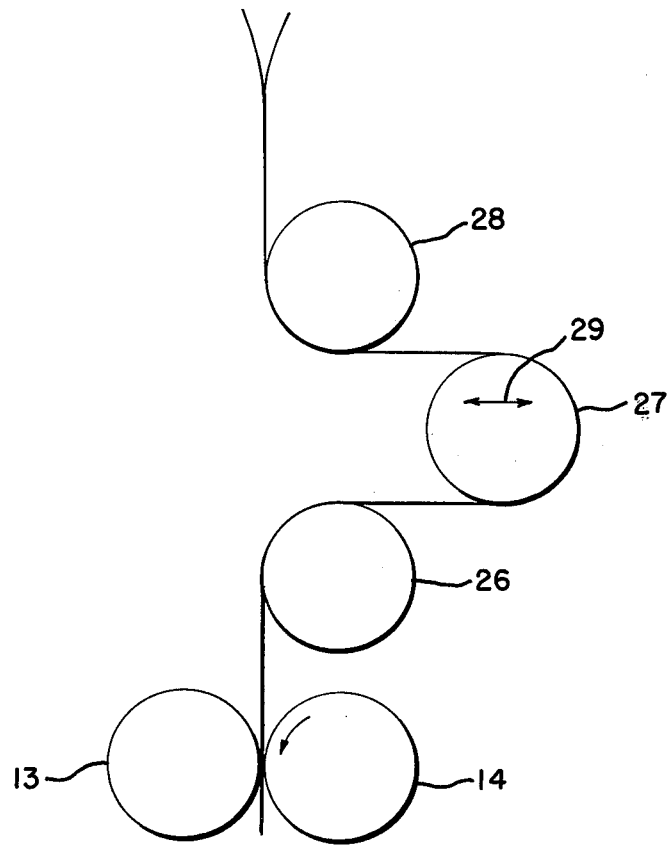
FIG. 5 shows an embodiment in which the position of an offset tensioning roller is changed.

FIG. 5 shows apparatus for drawing a waveguide including pulling rolls 13 and 14; and tensioning rolls 26, 27 and 28. Tensioning roll 27 is offset from the axis of draw. As indicated by the arrow 29, the tensioning roll 27 is moved transverse to the axis of draw to vary the pulling rate. This produces the desired diameter perturbations in the optical waveguide.

While particular embodiments of the invention have been shown and described, various modifications are within the true spirit and scope of the invention. The appended claims are intended to cover all such modifications.

What is claimed is:

1. The method of producing an optical waveguide comprising:

providing a glass tube having a core with an index of refraction higher than the cladding thereof, heating said glass tube to the drawing temperature of the materials thereof, drawing the heated composite structure with a single pair of pulling rollers to reduce the cross-sectional area thereof, and controlling the tangential velocity of said rollers with time to produce diameter varying perturbations spaced along the length of said waveguide.

2. A method of manufacturing an optical fiber comprising the steps of:

heating the lower extremity of a substantially vertically disposed preform to soften the preform; and drawing the optical fiber from said softened preform, said method being characterized by the further steps of:

passing said optical fiber, while still in a softened state, through a single pair of rollers having variations in radii which produces tangential velocity changes; and rotating said rollers in synchronism with the rate at which said fiber is drawn from the softened preform to produce diameter varying perturbations spaced along the length of said waveguide.

3. The method recited in claim 1 wherein said pulling rollers have a uniform diameter and wherein the rotational velocity of said pulling rollers is changed with time in order to produce said diameter perturbations.

4. The method recited in claim 1 wherein the rotational speed of said pulling rollers is constant and wherein said pulling rollers have a varying diameter in order to produce the changes in tangential velocity.

* * * * *